(12) United States Patent
Tsuda et al.

(10) Patent No.: US 8,649,941 B1
(45) Date of Patent: Feb. 11, 2014

(54) METHOD FOR OPERATING A VEHICLE SYSTEM

(75) Inventors: Hiroshi Tsuda, McLean, VA (US); Ronald S. Eisenhour, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/585,427

(22) Filed: Aug. 14, 2012

(51) Int. Cl.
*G06F 7/00* (2006.01)
*G06F 17/00* (2006.01)

(52) U.S. Cl.
USPC ................................ 701/49; 701/93; 701/96

(58) Field of Classification Search
CPC ......................................................... B60H 1/00
USPC .................... 701/49, 93, 96; 62/244; 382/106
See application file for complete search history.

(56) References Cited

U.S. PATENT DOCUMENTS

| | | | | |
|---|---|---|---|---|
| 5,529,028 A | * | 6/1996 | Weikert ...................... | 123/41.12 |
| 5,660,243 A | * | 8/1997 | Anzalone et al. ............ | 180/68.1 |
| 5,670,714 A | * | 9/1997 | Sorensen .................... | 73/117.01 |
| 5,732,676 A | * | 3/1998 | Weisman et al. ............ | 123/436 |
| 6,032,097 A | * | 2/2000 | Iihoshi et al. ................ | 701/96 |
| 7,071,839 B2 | * | 7/2006 | Patel et al. .................... | 340/933 |
| 7,860,639 B2 | * | 12/2010 | Yang .............................. | 701/117 |
| 8,160,800 B2 | * | 4/2012 | Hawkins et al. .............. | 701/101 |
| 2005/0044863 A1 | * | 3/2005 | Maeda et al. .................... | 62/125 |
| 2005/0230096 A1 | * | 10/2005 | Yamaoka ........................ | 165/202 |
| 2005/0273258 A1 | * | 12/2005 | MacNeille et al. ........... | 701/300 |
| 2006/0015242 A1 | * | 1/2006 | Yoshida .......................... | 701/96 |
| 2008/0264070 A1 | * | 10/2008 | Teschner et al. ............... | 62/3.61 |
| 2009/0150024 A1 | * | 6/2009 | Kojima et al. .................. | 701/36 |
| 2009/0188267 A1 | * | 7/2009 | Dai et al. ........................ | 62/239 |
| 2010/0256852 A1 | * | 10/2010 | Mudalige ........................ | 701/24 |
| 2011/0067419 A1 | * | 3/2011 | Aoyagi ........................... | 62/133 |
| 2012/0112915 A1 | | 5/2012 | Strumolo | |
| 2013/0066511 A1 | * | 3/2013 | Switkes et al. .................. | 701/28 |
| 2013/0124064 A1 | * | 5/2013 | Nemoto .......................... | 701/96 |
| 2013/0141578 A1 | * | 6/2013 | Chundrlik et al. ............. | 348/148 |

FOREIGN PATENT DOCUMENTS

| | | | | |
|---|---|---|---|---|
| JP | 10076836 A | * | 3/1998 | |
| JP | 2005127206 A | * | 5/2005 | |
| JP | 2005180249 A | * | 7/2005 | |
| JP | 2008196305 A | * | 8/2008 | |
| KR | 774428 B1 | * | 11/2007 | |

* cited by examiner

*Primary Examiner* — Fadey Jabr
*Assistant Examiner* — Angelina Shudy
(74) *Attorney, Agent, or Firm* — Global IP Counselors (57) ABSTRACT

A method for operating an HVAC system in a host vehicle. The method includes detecting a following distance between the host vehicle and another vehicle, and operating an on-board control device to control the HVAC system in the host vehicle to operate in a first mode while the following distance is detected as being greater than a threshold distance and to automatically operate in a second mode while the following distance is detected as being less than or equal to the threshold distance.

21 Claims, 6 Drawing Sheets

$Te > Tt \longrightarrow$ perform engine cooling countermeasure
(In this case, where $Dc > Ds$ control host vehicle
to increase desired following distance Ds and
detected following distance Df to an engine
cooling distance Dc)

FIG. 5

$Df > Dt \longrightarrow$ Continue to operate in the First mode

METHOD FOR OPERATING A VEHICLE SYSTEM

BACKGROUND

1. Field of the Invention

The present invention generally relates to a method for operating a vehicle system, such as a vehicle heating ventilation and air conditioning (HVAC) system. More specifically, the present invention relates to a method for operating a vehicle HVAC system based on a following distance between the vehicle and another vehicle or other prescribed characteristics.

2. Background Information

Most vehicles include a climate control system, such as an HVAC system, which allows a passenger of the vehicle to switch between a fresh air mode and a recirculation mode. In the fresh air mode, a fresh air vent is opened to introduce fresh air into the vehicle. In the recirculation mode, the fresh air vent is closed and the air within the vehicle is recirculated. Recirculation provides a climate control capacity advantage in that the cabin temperature is less extreme than the outside conditions. For example in heating conditions, it is much easier to deliver warm air from a heater using 0° C. air from within the cabin than −40° C. outside air. In cooling conditions, it is easier to cool 25° C. air from within the cabin than +40° C. outside air. Thus, when the driver first starts up the vehicle on a very hot day or a very cold day, the driver may set the controls to a recirculation mode to warm up or cool-down the cabin at a faster rate than if outside air was utilized.

However, there may be other instances where it is desirable for the climate control system to operate in a fresh air mode instead of a recirculation mode, and vice-versa. In view of the above, it will be apparent to those skilled in the art from this disclosure that there exists a need for an improved system and method for operating a vehicle HVAC system. This invention addresses this need in the art as well as other needs, which will become apparent to those skilled in the art from this disclosure.

SUMMARY

In accordance with one aspect of the present invention, a method for operating an HVAC system in a host vehicle is provided. The method includes detecting a following distance between the host vehicle and another vehicle, and operating an on-board control device to control the HVAC system in the host vehicle to operate in a first mode while the following distance is detected as being greater than a threshold distance and to automatically operate in a second mode while the following distance is detected as being less than or equal to the threshold distance.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the disclosed embodiments are provided for illustration only and not for the purpose of limiting the invention as defined by the appended claims and their equivalents.

Figure 1:
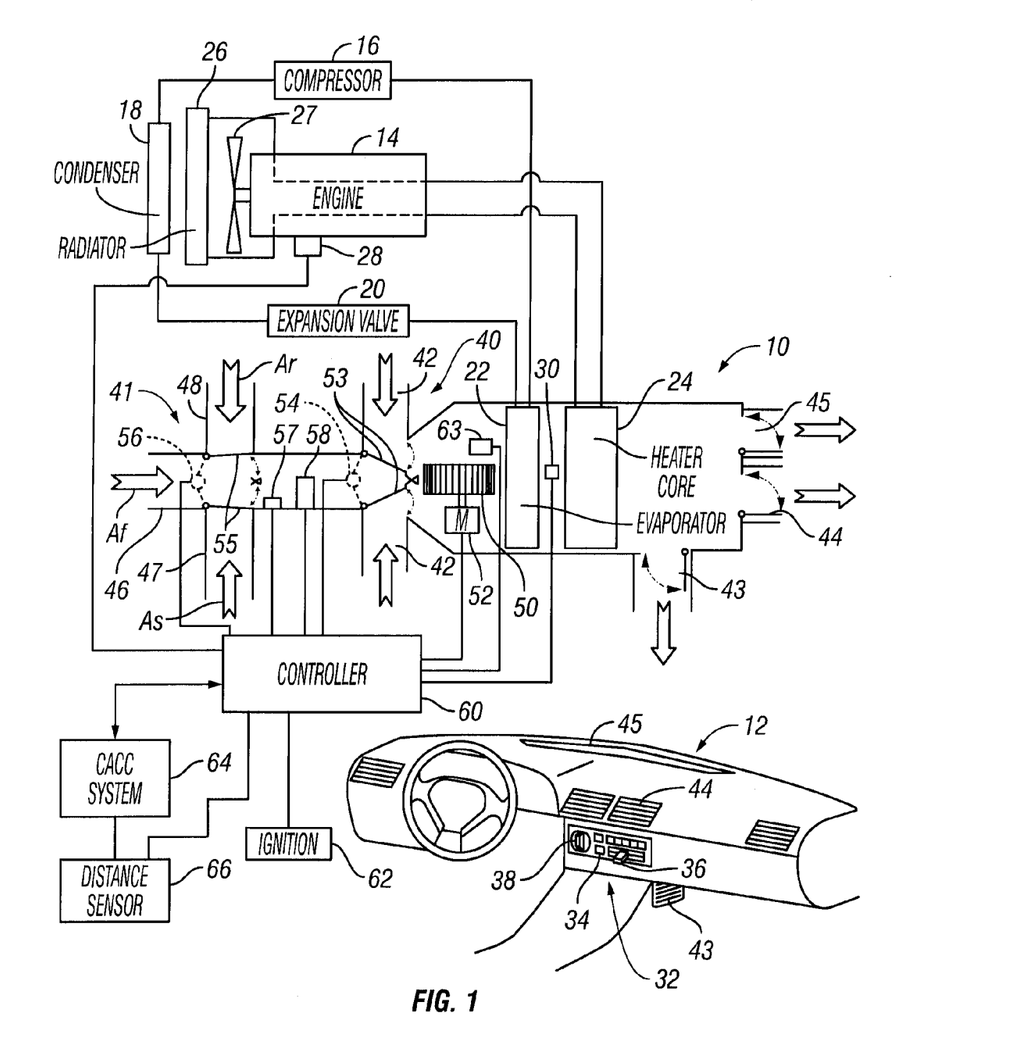
FIG. 1 is an overall schematic diagram of a vehicle equipped with a vehicle HVAC system that is controlled based on a method in accordance with a disclosed embodiment.

Referring initially to FIG. 1, an overall schematic diagram of a vehicle HVAC system 10 operating in accordance with a vehicle HVAC operating method according to a disclosed embodiment is illustrated. The vehicle HVAC system 10, which can also be referred to as a climate control system, is installed in a vehicle 12. Basically, the vehicle HVAC system 10 includes, among other things, an engine 14, a compressor 16, a condenser 18, an expansion valve or orifice 20, an evaporator 22, a heater core 24, a radiator 26, a fan 27 and an engine temperature sensor 28. The components 14, 16, 18, 20, 22, 24 and 26 constitute at least part of a refrigerant circuit for the air conditioner of the vehicle 12. The engine 14, the heater core 24 and the radiator 26 constitute a heater circuit for the heater of the vehicle 12. These components 14, 16, 18, 20, 22, 24, 26, 27 and 28 are conventional components that are well known in vehicles. Since these components 14, 16, 18, 20, 22, 24, 26, 27 and 28 are well known, the structures of these components will not be discussed or illustrated in detail herein except as they relate to the operation of the HVAC system 10 according to the disclosed embodiments.

The compressor 16 is fluidly connected to the condenser 18 via a refrigerant pipe or conduit. The condenser 18 is located in front of the radiator 26 that cools the engine coolant of the engine 14. The evaporator 22 is also fluidly connected to the compressor 16 via a refrigerant pipe or conduit. The expansion valve 20 is fluidly connected to the condenser 18 via a refrigerant pipe or conduit, and to the evaporator 22 by a refrigerant pipe or conduit. Thus, a refrigerant such as Freon, R134a, or any other suitable refrigerant, is circulated through the refrigerant circuit of the air conditioner to cool the passenger compartment or vehicle cabin.

The compressor 16 receives and compresses a cool vapor-phase refrigerant from the evaporator 22. The compressor 16 is preferably turned "on" and "off" by selectively energizing and de-energizing the electromagnetic clutch of the compressor 16 to adjust the temperature and pressure of the evaporator 22. For example, a thermal switch 30 is disposed at the evaporator 22 to sense the temperature of the evaporator 22 such that the thermal switch 30 selectively turns the compressor 16 "on" and "off" depending on the temperature of the evaporator 22. In the illustrated embodiment, the thermal switch 30 opens when the temperature of the evaporator 22 is below a prescribed temperature T1 (e.g., about 0° C.) and closes when the temperature of the evaporator 22 is above a prescribed temperature T2 (e.g., about 3° C.). When the thermal switch 30 opens, a control circuit of the compressor 16 is opened to deactivate the compressor 16 and to avoid forming ice on the evaporator 22. When the thermal switch 30 closes, the control circuit of the compressor 16 is grounded to activate the compressor 16. In this way, the compressor 16 is cycled "on" and "off" to maintain the selected cabin temperature when the air conditioner is operating. Also operation of the compressor 16 to maintain the evaporator temperatures at these temperatures is effective in preventing window fogging, since humidity can be condensed from the air stream entering the cabin. Thus, the thermal switch 30 is a thermal sensing arrangement configured to detect a prescribed temperature condition, such as prescribed temperature conditions corresponding to the opening and closing of the switch 30.

The engine 14, the heater core 24 and the radiator 26 are all fluidly connected such that heat from the engine 14 is transferred to the cabin by the heater core 24 in a conventional manner. Thus, as the engine 14 warms up, the heater core 24 is also warmed up.

As seen in FIG. 1, the operations of the climate control system can be controlled by a set of operator controls 32 that are located in the cabin of the vehicle 12. The operator controls 32 typically will include an A/C "on/off" switch 34, a temperature control 36 and a blower fan speed control 38. The climate control system also has an air duct system 40 with a fresh air duct 41, a pair of recirculation ducts 42, a floor duct 43, a main duct 44 and a defrost duct 45. The fresh air duct 41 can include via a single fresh air inlet or, more preferably, a plurality of fresh air inlets. For example, the fresh air duct 41 can be coupled to at least one forward facing inlet 46 that is open in a forward direction of the vehicle 12, and thus can receive ambient air external to the host vehicle 12 via the forward facing inlet 46. The fresh air duct 41 can be coupled to at least one side facing inlet 47 that is open in a direction toward at least one side of the vehicle 12. Naturally, the fresh air duct 41 can be coupled to a plurality of side facing inlets 47 that are open to both sides of the vehicle 12. Furthermore, the fresh air duct 41 can be coupled to at least one rear facing inlet 48 that is open in a rearward direction of the vehicle 12. Thus, as shown, the forward facing inlet or inlets 46, the side facing inlet or inlets 47 and the rear facing inlet or inlets 48 can be coupled together to feed into the air duct system 40 a single fresh air duct 41.

The evaporator 22 and the heater core 24 are disposed in the air duct system 40 downstream of a blower 50 that is operated by a motor 52. The blower 50 is located downstream of the fresh air duct 41 and the recirculation ducts 42. The fresh air duct 41 and the recirculation ducts 42 are alternately opened and closed by a pair of recirculation doors 53. The recirculation doors 53 are opened and closed by a recirculation door actuator 54. Similarly, the forward facing inlet or inlets 46, the side facing inlet or inlets 47 and the rear facing inlet or inlets 48 of the fresh air duct 41 are alternately opened and closed by a pair of doors 55. The doors 55 are opened and closed by a door actuator 56.

In addition, a sensor 57 can be present in the fresh air duct 41 to detect for existence of an impurity characteristic of ambient air entering the vehicle 12, such as smog and other airborne impurities. Furthermore, a purifying device 58 can be present in the fresh air duct 41 and operable to clean, purify, filter and/or ionize ambient air external to the vehicle 12 in a manner as understood in the art before supplying the ambient air to the passenger compartment of the vehicle 12.

The operations of climate control systems are well known, and thus only automatic control, such as the automatic control of switching between a fresh air mode and a recirculation mode, by the vehicle HVAC system 10 will be discussed in accordance with disclosed embodiments. As discussed in more detail below, the vehicle HVAC system 10 automatically switches between a fresh air mode and a recirculation mode if certain prescribed conditions are met, regardless of the mode in which the HVAC system 10 has been previously set by, for example, the operator controls 32. That is, the vehicle HVAC system 10 includes a controller 60 that controls switching between the fresh air mode and recirculation mode. The controller 60 preferably includes a microcomputer with a control program that controls the recirculation door actuator 54 and door actuator 56 as discussed below. The controller 60 includes other conventional components such as an input interface circuit, an output interface circuit, and storage devices such as a ROM (Read Only Memory) device and a RAM (Random Access Memory) device. The microcomputer of the controller 60 is at least programmed to control the recirculation door actuator 54 and door actuator 56 in accordance with the flow chart of FIG. 3 as discussed below. It will be apparent to those skilled in the art from this disclosure that the precise structure and algorithms for the controller 60 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The controller 60 is operatively connected to a vehicle ignition switch 62 so that the controller 60 can become activated when the vehicle ignition is started. The controller 60 is further operatively connected to a thermal sensing arrangement (e.g., the thermal switch 30) that detects a prescribed temperature condition, and a blower speed sensing arrangement 63 positioned at, for example, the hot side of the blower terminal of blower 50 that provides a prescribed blower signal (e.g., a prescribed voltage) indicative of a prescribed blower speed condition. The controller 60 can thus selectively activate the recirculation door actuator 53 to switch between a normal air intake mode (i.e., the passenger's selection of either the fresh mode or the recirculation mode) and a recirculation override mode based on the prescribed temperature condition detected by the thermal sensing arrangement 30 and the prescribed blower signal received from the blower speed sensing arrangement 63.

The controller 60 also is operatively coupled to the fan 27, the engine temperature sensor 28, the sensor 57 and the purifying device 58 to receive signals from the sensors 28 and 57 and to control the fan 27 and the purifying device 58 for reasons discussed in more detail below. In addition, the controller 60 is operatively connected to a cruise control system 64. The cruise control system 64 typically includes one or more microcomputers and related components similar to those discussed above with regard to controller 60. In this example, the cruise control system 64 is a cooperative adaptive cruise control (CACC) system as known in the art. However, the cruise control system 64 can be an adaptive cruise control (ACC) system or any other suitable type of cruise control or distance measuring system as understood in the art. The cruise control system 64 can include one or more distance sensors 66, which can be any type of ranging equipment such as radar sensors, infrared sensors, sonar sensors and so on as understood in the art, that enable the cruise control system 64 to determine a distance between the vehicle 12 and surrounding objects, such as other vehicles, as discussed below.

Figure 2:
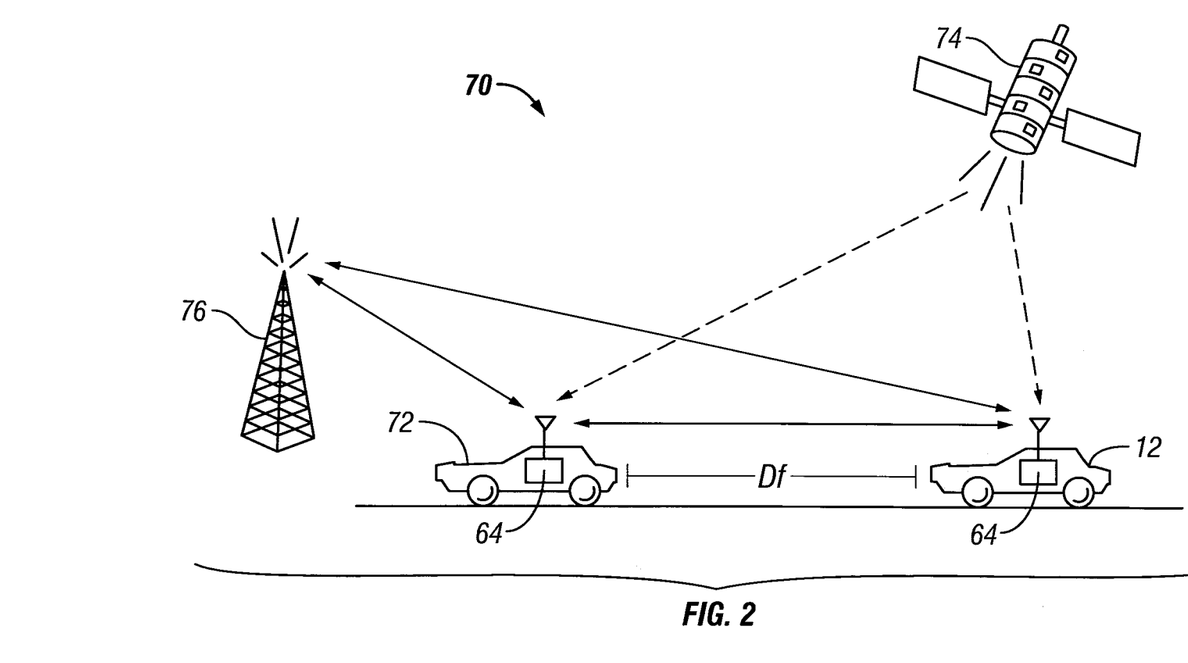
FIG. 2 is an exemplary diagram of a cooperative adaptive cruise control system employed in the vehicle of FIG. 1.

An example of additional features associated with the cruise control system 64 is shown in FIG. 2. As shown, the cruise control system 64 of the vehicle 12 communicates with a two-way wireless communications network 70. Several neighboring or nearby vehicles 72 can each be equipped with a cruise control system 64. The two-way wireless communications network 70 also includes one or more global positioning satellites 74 (only one shown) and one or more roadside units 76 (only one shown) that send and receive signals to and from the vehicles 12 and 72. In this arrangement, the vehicle 12 can be referred to as a "host vehicle 12" or simply "vehicle 12." The vehicle or vehicles 72 that are located in front of the host vehicle 12 relative to its direction of travel can be referred to as "forward vehicle(s)" or "preceding vehicle(s)", while the vehicle or vehicles 72 that are behind the host vehicle 12 relative to its direction of travel can be referred to as "following vehicle(s)." The term "neighboring vehicle(s)" refers to a vehicle or vehicles 72 that are located within a communication (broadcasting/receiving) area surrounding the host vehicle 12 in which the host vehicle 12 is capable of either broadcasting a wireless signal to another vehicle 72 within a certain range and/or receiving a signal from another vehicle 72 within a certain range. Thus, the "neighboring vehicles" can include forward and following vehicles 72.

Accordingly, the cruise control system 64 or controller can determine the respective distances between the vehicle 12 and any neighboring vehicles 72 in a manner as understood in the art. Also, the vehicle 12 and the other vehicles 72 can wirelessly communicate information about themselves to each other. For example, the vehicle 12 and other vehicles 72 can inform each other of their locations to determine the distance between them, or whether they are a low-emission vehicle, such as an electric vehicle, or a hybrid vehicle. As used herein, the term "low-emission vehicle" can refer to a zero emission vehicle such as a purely electric vehicle, a hybrid vehicle, or a combustion vehicle that is equipped to minimize emissions below a particular threshold to be classified as a low-emission vehicle in the automotive industry. In addition, the vehicle 12 and any of the other vehicles 72 can be equipped with a forward vehicle brake warning system that provide a warning an operator of the host vehicle 12 that a neighboring vehicle 72 or forward vehicle 72 in or proximate the path of the host vehicle 12 is currently braking or decelerating.

Figure 3:
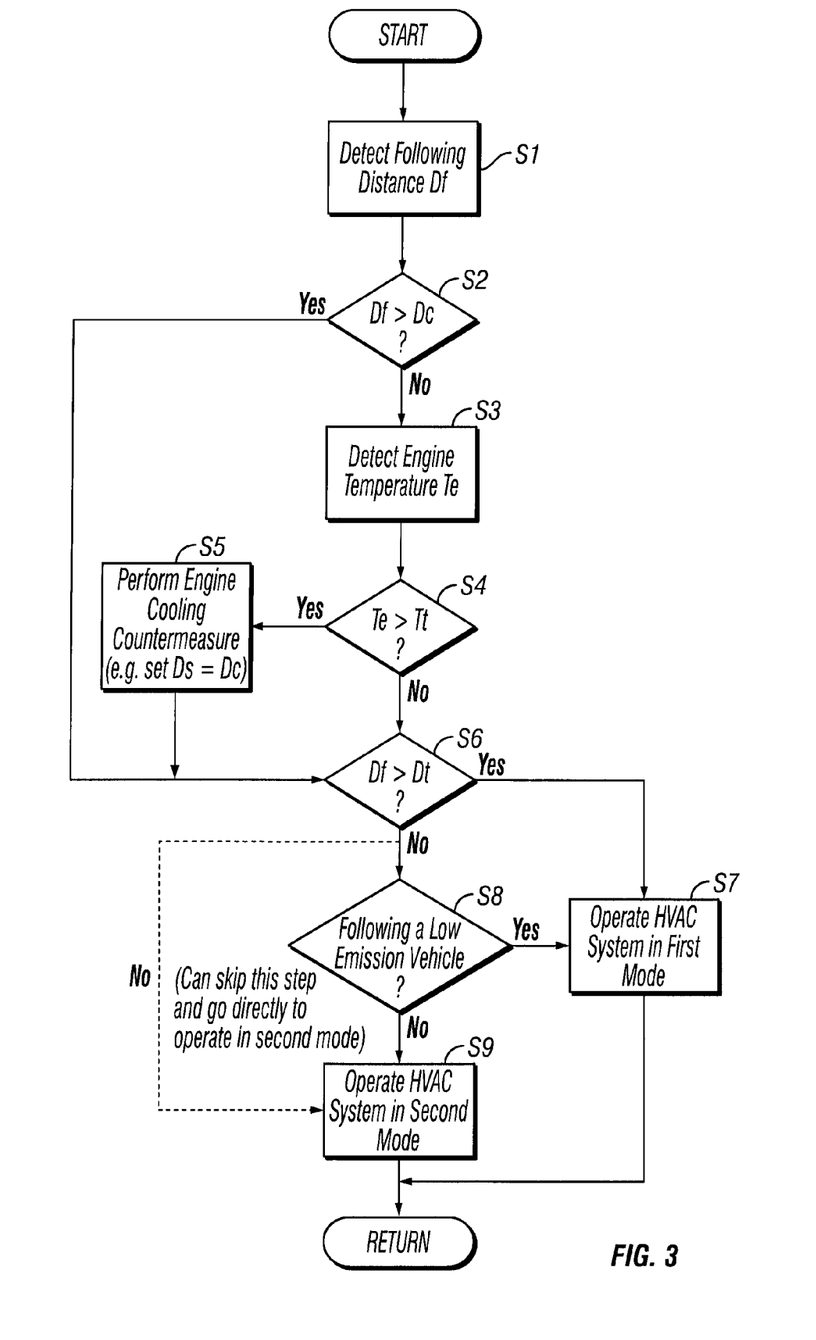
FIG. 3 is a flowchart illustrating exemplary operations that are performed by the method for controlling the vehicle HVAC system shown in FIG. 1.

In addition, the controller 60 uses the detected vehicle distance information received from the distance sensors 66 or the cruise control system 64 to control the HVAC system 10 as will now be discussed with regard to the flowchart in FIG. 3 and the diagrams shown in FIGS. 4 through 8. Specifically, a method for operating the HVAC system 10 in the host vehicle 12 as shown in FIG. 3 can be performed by, for example, the controller 60 alone or in cooperation with cruise control system 64. The controller 60 can also be referred to as an on-board control device 60.

Figure 4:
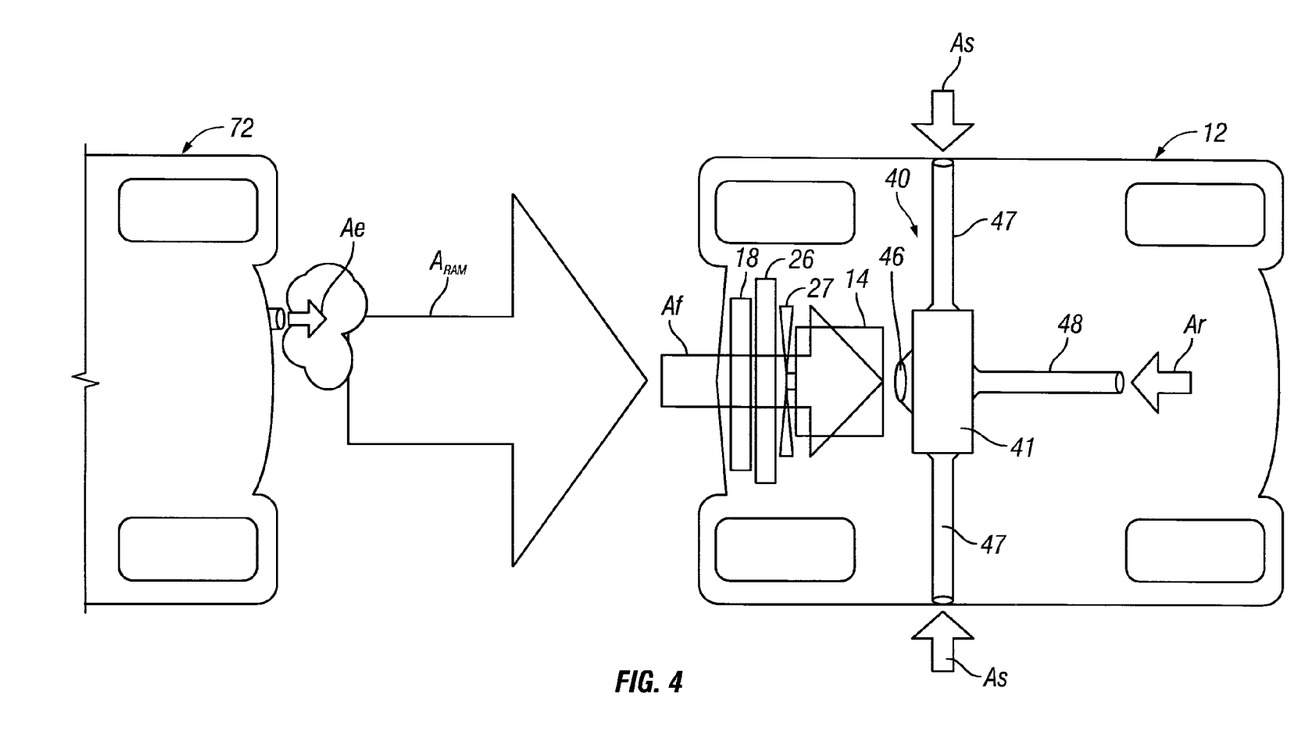
FIG. 4 is a block diagram illustrating an example of ambient air flow with respect to the vehicle and a preceding vehicle as shown in FIGS. 1 and 2.

As the host vehicle 12 is traveling in a forward direction as shown in FIG. 4, ram air $A_{RAM}$ is received in any forward facing inlet 46 as front or first external ambient air Af. Exhaust Ae from the neighboring vehicle 72 can mix with the ram air $A_{RAM}$ as shown. In addition, any side facing inlet 47 can receive side external ambient air As, and any rear facing inlet 48 can receive rear external ambient air Ar. The side external ambient air As and the rear external ambient air Ar can be referred to as second external ambient air.

It should be noted that drivers that use a cruise control system 64 such as an adaptive cruise control system or cooperative adaptive cruise control system tend to position their vehicle 12 to follow closer to other vehicles 72 when the cruise control system 64 is activated. However, some drivers naturally tend to position their vehicle 12 to follow closer to other vehicles 72 (e.g., tailgate) whether or not they are using a cruise control system 64. As shown in FIG. 4, since exhaust Ae from the another vehicle 72 mixes with the ram air $A_{RAM}$, some exhaust Ae can be introduced into the HVAC system 10 via any forward facing inlet 46. Following closely to another vehicle 72 increases the concentration of the exhaust Ae in the front external ambient air Af. Furthermore, the ram air $A_{RAM}$ helps to cool the engine 14 to maintain the engine temperature Te low. Therefore, following closely to another vehicle 72 can impede the flow of ram air $A_{RAM}$ which can result in an increase the engine temperature Te.

As understood in the art, a cruise control system 64 that is an adaptive cruise control system or a cooperative adaptive cruise control system enables a user to set a desired following distance Ds (see FIGS. 5 through 8) between the host vehicle 12 and another vehicle 72 via, for example, a control panel as understood in the art. This desired following distance Ds can be, for example, less than or equal to a prescribed threshold distance Dt, which can be a preset value, or can be greater than the prescribed threshold distance Dt if desired. Accordingly, the cruise control system 64 can operate to enable a user to manually set a desired following distance Ds.

As will now be discussed in more detail, the cruise control system 64 can receive signals from the engine temperature sensor 28, the sensor 57 and the distance sensor 66 either directly or via the controller 60, and can set or adjust the following distance Df at which the host vehicle 12 follows another vehicle 72 based on information contained in those signals. For example, the cruise control system 64 can set the following distance Df at a greater distance than the desired following distance Ds to improve the flow of ambient air Af into the engine compartment of the host vehicle 12 to cool the engine 14 if the engine temperature sensor 28 indicates that the engine temperature is increasing or is higher than desired. Also, the cruise control system 64 can set the following distance Df at a greater distance than the desired following distance Ds to reduce the concentration of exhaust Ae from another vehicle 72 in the ambient air Af entering the forward facing inlet 46 if the sensor 57 indicates that the level of impurities in the ambient air Af is increasing or is greater than desired. Naturally, the cruise control system 64 can set the following distance Df by overriding any desired following distance Ds that was set by a user or the following distance Df at which the user is manually controlling the host vehicle 12 to follow behind another vehicle 72 while driving. Furthermore, the set desired following distance Ds that the cruise control system 64 sets based on the signals from the engine temperature sensor 28, the sensor 57 and the distance sensor 66 can be less than, equal to or greater than the threshold distance Dt as appropriate. In addition, the cruise control system 64 can be used to set a desired following distance Ds between the host vehicle 12 and another vehicle 72 to form a cooperative platoon of two or more vehicles including at least the host vehicle 12 and the another vehicle 72 as shown, for example, in FIG. 2.

Turning now to the flowchart of FIG. 3, an actual or detected following distance Df between the host vehicle 12 and a preceding vehicle 72 is detected by, for example, the distance sensors 66 in step S1. As discussed above, the cruise control system 64 or controller 60 can receive information from the distance sensors 66 which detects the following distance Df between the host vehicle 12 and the preceding vehicle 72.

In step S2, the controller 60 determines whether the detected following distance Df is greater than a cooling distance Dc. The cooling distance Dc is a distance at which the host vehicle 12 can travel behind a preceding vehicle 72 so that the flow of the ram air $A_{RAM}$ into the engine compartment of the vehicle 12 is sufficient to cool the engine 14.

Figure 5:
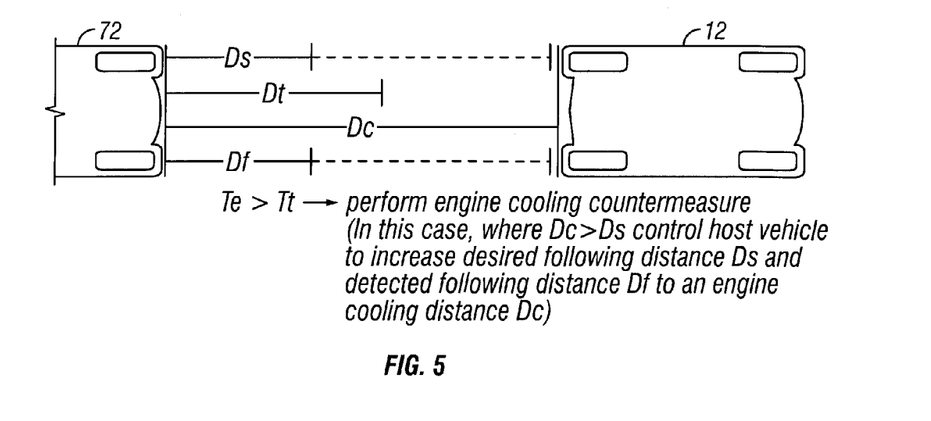
FIG. 5 is a block diagram illustrating an example of the vehicle following a preceding vehicle at a following distance that is increased in accordance with an increase in a desired following distance such that the desired following distance and the following distance become equal to an engine cooling distance.

When the detected following distance Df is not greater than the cooling distance Dc, the controller 60 can receive signals from the engine temperature sensor 28 to sense a temperature Te of the engine 14 of the host vehicle 12 in step S3. While the temperature Te of the engine 14 is detected in step S4 as being greater than a temperature threshold Tt, the controller 60 can automatically perform at least one cooling countermeasure in step S5. For example, the controller 60 can provide a visual and/or audible warning in the host vehicle 12 via, for example, a display panel and/or speaker. The controller 60 can also control the cruise control system 64 to automatically adjust the desired following distance Ds of the host vehicle 12 to be greater than or equal to the cooling distance Dc. For example, as shown in FIG. 5, the cooling distance Dc is greater than the desired following distance Ds and the threshold distance Dt. Of course, the cooling distance Dc and the desired following distance Ds can be equal to each other. Also, the cooling distance Dc, the desired following distance Ds, or both, can be equal to or greater than the threshold distance Dt. Thus, when the cooling distance is greater than the desired following distance Ds as shown in FIG. 5, the desired following distance Ds of the host vehicle 12 is increased to be greater than or equal to the cooling distance Dc. In this event, the detected following distance Df of the host vehicle 12 will transition to the newly set desired following distance Ds, and will thus become equal to the cooling distance Dc as shown in FIG. 5. Furthermore, the controller 60 can operate the engine cooling fan 27 or increase the speed of the engine cooling fan 27 to cool the engine 14. Naturally, the controller 60 can perform any or all of these cooling countermeasure operations simultaneously as needed or desired, or can perform some or all of these operations at different times when the temperature Te of the engine 14 is detected in step S4 as being greater than the temperature threshold Tt.

If the temperature Te of the engine 14 is detected in step S4 as being less than a temperature threshold Tt, or after the at least one cooling countermeasure has been performed in step S5, the processing continues to step S6. In step S6, the controller 60 determines whether the detected following distance Df is greater than the threshold distance Dt. If the controller 60 determines that the detected following distance Df is greater that the threshold distance Dt, the controller 60 is operated to automatically control the HVAC system based on the detected following distance Df so that the HVAC system 10 automatically operates or automatically maintains operation in a first mode in step S7.

Figure 6:
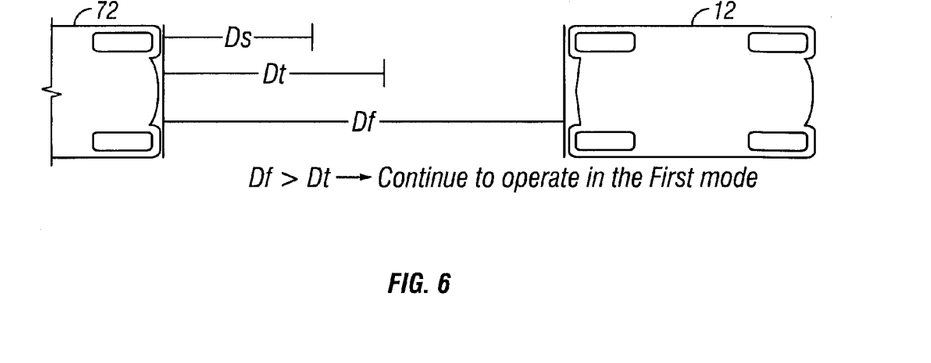
FIG. 6 is a block diagram illustrating an example of the vehicle following a preceding vehicle at a following distance greater than a threshold distance.

That is, as shown in FIG. 6, the detected following distance Df is greater than the threshold distance Dt (Df>Dt), so the HVAC system 10 operates in the first mode. The HVAC system 10 continues to operate in the first mode even as the host vehicle 12 begins to approach the desired following distance Ds between the host vehicle 12 and another vehicle 72 as long as the detected following distance Df is greater than the threshold distance Dt. As discussed above, the desired following distance Ds could be set by the cruise control system 64, can be set during the cooling countermeasure operations in step S5, or can represent the subjective desired following distance of the driver of the host vehicle 12.

For purposes of this example, the first mode can be a fresh air mode which receives ambient air from external to the host vehicle 12 and passes that air into a passenger compartment of the host vehicle 12 as discussed above with regard to FIG. 1. That is, the controller 60 can control the recirculation door actuator 54 to open the recirculation doors 53 to the fresh air duct 41 so that external ambient air is passed into the passenger compartment of the host vehicle via the fresh air duct 41. In other words, when controller 60 operates to control the HVAC system 10 to automatically operate in the first mode, the HVAC system 10 operates to supply ambient air from external the host vehicle 12 directly to a passenger compartment of the host vehicle 12. For example, the operating of the on-board control device to control the HVAC system 10 to automatically operate in the first mode includes operating the HVAC system 10 to open a forward facing inlet 46 and receive ambient air from external the host vehicle 12 via the forward facing inlet 46 and pass that air into the fresh air duct 41. Hence, in this regard, the first mode is a first fresh air mode which includes automatically operating the HVAC system 10 to open a forward facing inlet 46 and receive a first external ambient air from external the host vehicle 12 via the forward facing inlet 46 and pass the first external ambient air to the passenger compartment of the vehicle 12.

Also, when operating in the first mode in step S7, the controller 60 can control the HVAC system 10 to clean, purify, filter and/or ionize ambient air external to the host vehicle 12 before supplying the ambient air to a passenger compartment of the host vehicle 12. That is, the controller 60 can receive a signal from the sensor 57 indicating impurity characteristics of the ambient air entering the fresh air duct 41. If the controller 60 determines based on the signal that the impurity characteristics, such as smog, are at an unacceptable level, the controller can control the purifying device 58 to clean, purify, filter and/or ionize ambient air passing through the fresh air duct 41. Naturally, as discussed above, the first mode could be selected by the user can be this type of first fresh air mode or any other desired mode as discussed herein.

The processing then returns to step S1 and repeats as discussed above.

Figure 7:
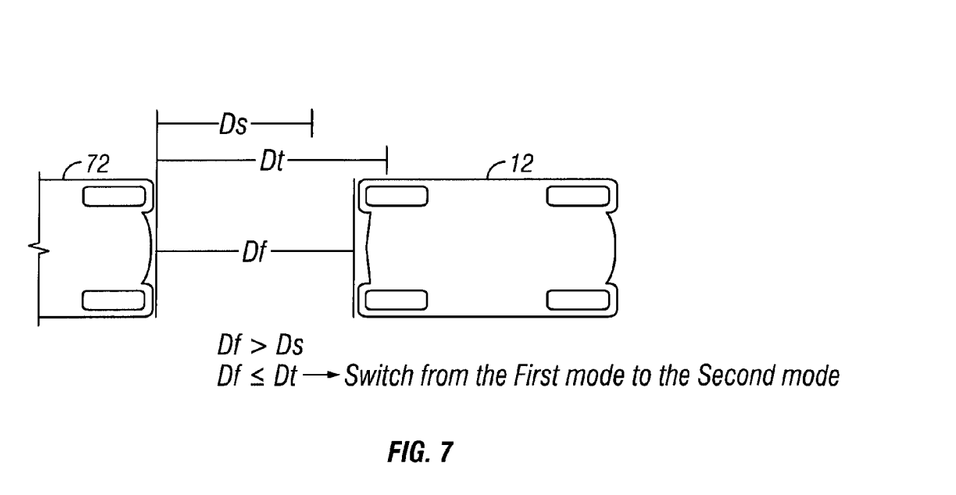
FIG. 7 is a block diagram illustrating an example of the vehicle following a preceding vehicle at a following distance less than a threshold distance.
Figure 8:
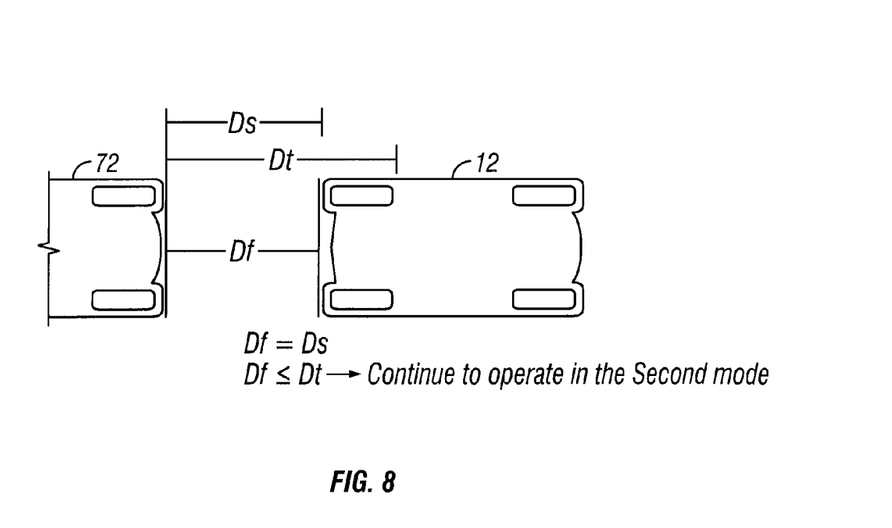
FIG. 8 is a block diagram illustrating an example of the vehicle following a preceding vehicle at a following distance less than a threshold distance and equal to a desired following distance.

Alternatively, if the controller 60 determines in step S6 that the detected following distance Df is or has become less than or equal to the threshold distance Dt (Df≤Dt) as shown in FIGS. 7 and 8, the processing continues to step S8. In step S8, the controller 60 determines, based on information received from the other vehicle 72 via the cruise control system 64, whether any of the vehicles 12 and 72 in the platoon of vehicles or among the nearby vehicles is a low-emission vehicle. For example, as discussed above, the other vehicles 72 can wirelessly transmit their respective information to the vehicle 12. This respective information can indicate whether a vehicle 72 is an electric vehicle, a hybrid vehicle or a combustion engine vehicle. If the controller 60 determines that the preceding vehicle 72 is a low-emission vehicle, the processing can proceed to step S7 as discussed above where the controller 60 can control the HVAC system 10 to automatically operate in a first mode regardless of the distance at which the host vehicle 12 is following the preceding vehicle 72. Alternatively, the first mode can be any operation that is selected by a user via, for example, the operator controls 32. Thus, the controller 60 can control the HVAC system 10 to operate in the first mode based on user input that the controller 60 receives via the operator controls 32. In addition, the controller 60, for example, can communicate via the cruise control system 64 to the cruise control systems 64 in the other vehicles 72 to present a suggested order to each of the vehicles 12 and 72 in the platoon, such that the suggested order includes the detected low-emission vehicles in leading positions of the platoon.

However, if the controller 60 determines in step S8 that the other vehicle 72 is not a low-emission vehicle, or it cannot be determined whether the other vehicle 72 is or is not a low-emission vehicle, the processing continues to step S9. It should also be noted that instead of performing step S8 to determine whether the host vehicle 12 is following a low emission vehicle, the processing can skip step S8 and proceed directly from step S6 to step S9 while the detected following distance Df is less than or equal to the threshold distance Dt.

In step S9, the controller 60 controls the HVAC system 10 to automatically operate in a second mode, or to automatically switch from operating in the first mode to operating in the second mode. Moreover, as discussed above, the desired following distance Ds can be set to be less than or equal to the threshold distance Dt, or can represent the subjective desired following distance of the driver of the host vehicle 12. Thus, the on-board control device 60 can automatically control the HVAC system 10 to operate in the second mode when detected the following distance Df reaches the threshold distance Dt as the host vehicle approaches the set desired following distance Ds which, in this example, is less than the threshold distance Dt. In the particular example shown in FIG. 6, the detected following distance Df is still greater than the desired following distance Ds (Df>Ds).

The second mode can be, for example, a recirculation mode which recirculates air within the passenger compartment of the host vehicle 12 as discussed above with regard to FIG. 1. That is, the controller 60 can control the recirculation door actuator 54 to close the recirculation doors 53, such as the forward recirculation or blend doors 53 located in a forward section of the host vehicle 12, so that air is recirculated in the passenger compartment of the host vehicle 12. In other words, the HVAC system 10 receives internal air from within the passenger compartment of the host vehicle 12 and returns the internal air back to the passenger compartment.

Alternatively, the operating of the on-board control device to control the HVAC system 10 to operate in the second mode can include operating the HVAC system 10 to control the door actuator 56 to close the doors 55 to obstruct the forward facing inlet 46 and receive ambient air from external the host vehicle 12 via at least one of a side facing inlet 47 and a rear facing inlet 48 and pass that air into the fresh air duct 41. Hence, in this regard, the second mode is a second fresh air mode which includes automatically operating the HVAC system 10 to obstruct the forward facing inlet 46 and receive a second external ambient air (As and/or Ar) from external the host vehicle 12 via at least one of a side facing inlet 47 and a rear facing inlet 48 and pass the second external ambient air (As and/or Ar) to the passenger compartment.

Furthermore, the operating of the on-board control device 60 to control the HVAC system 10 to operate in the second mode includes operating the impurity sensor 57 to detect for existence of an impurity characteristic of ambient air entering from external the host vehicle while the following distance Df is less than or equal to the threshold distance Dt, and operating the HVAC system 10 to operate purifying device 58 to at least one of clean, purify, filter and ionize ambient air from external the host vehicle before supplying that air to a passenger compartment of the host vehicle 12 while the impurity characteristic is detected to exist. Thus, the quality of the air reaching the passenger compartment of the vehicle 12 can be improved by receiving a second external ambient air such as the side external ambient air As, the rear external ambient air Ar, or both, via any side facing inlet 47, rear facing inlet 48, or both, that are spaced apart from the forward facing inlet or inlets 46, and/or by cleaning, purifying and/or ionizing the external ambient air received via any of the inlets 46 through 48. The controller 60 can also control the engine cooling fan 27 to run, or increase the running speed of the engine cooling fan 27 if it is already running, during the second mode while the detected following distance Df is less than or equal to the threshold distance Dt. In any event, when the controller 60 controls the HVAC system 10 to operate in the second mode, the controller 60 can override any user selected operation and perform the predetermined operations to provide the best HVAC performance, best air quality for the passenger compartment of the vehicle 12, and best engine cooling performance as discussed above. If the user coincidentally had set the HVAC system 10 to operate in this manner during the first mode, the controller 60 could maintain these operations of the HVAC system 10 in the second mode. However, it should be noted that the controller 60 is determining whether to change or maintain some or all of these operations in the second mode and thus, is overriding the user selected operations.

The processing then repeats as discussed above. As can be appreciated from the above, the controller 60 controls the HVAC system 10 to continue to operate in the second mode while the controller determines in step S6 that the detected following distance Df is less than or equal to the threshold distance Dt but greater than the desired following distance Ds as shown in FIG. 7, or when the detected following distance reaches the desired following distance Ds that is less than the threshold distance Dt as shown in FIG. 8 (Df=Ds and Df≤Dt). However, if the controller 60 determines in step S6 that the detected following distance Df has become greater than the threshold distance Dt, such as in FIG. 6, the controller 60 can control the HVAC system 10 to automatically switch to operate in the first mode in step S7 as discussed above.

Accordingly, as can be appreciated from the above, the HVAC system 10 operates based on a detected following distance Df between the vehicle 12 and another vehicle 72 or other prescribed characteristics, such as information contained in the signals from the engine temperature sensor 28 and the sensor 57, to improve performance of the HVAC system 10. For example, the HVAC system 10 is controlled to minimize or at least reduce the presence of exhaust Ae from a preceding vehicle 72 in ambient air that is fed into the passenger compartment of the vehicle 12. The HVAC system 10 and cruise control system 64 are further controlled to prevent overheating or at least reduce the temperature Te of the engine 14 of the vehicle 12.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

The invention claimed is:

1. A method for operating a heating, ventilation, and air condition (HVAC) system in a host vehicle based on a following distance between the host and a preceding vehicle, the method comprising:
   receiving a preceding vehicle communication including a low-emission indication;
   determining whether the preceding vehicle is a low-emission vehicle based on the low-emission indication of the preceding vehicle communication;
   detecting the following distance between the host vehicle and another the preceding vehicle;
   operating an on-board control device to control the HVAC system in the host vehicle to automatically operate in a first mode while the following distance is detected as being greater than a threshold distance regardless of the low-emission indication, automatically operate in the first mode while the preceding vehicle is determined to be a low-emission vehicle regardless of the following distance, and automatically operate in a second mode while the following distance is detected as being less than or equal to the threshold distance and the preceding vehicle is not detected to be a low-emission vehicle;
   operating a cooperative adaptive cruise control system to form a cooperative platoon of at least the host vehicle and the preceding vehicle and set a desired following distance between the host vehicle and the preceding vehicle; and
   automatically operating the cooperative adaptive cruise control system of the host vehicle to present a suggested order, the suggested order including the low-emission vehicles of the cooperative platoon in leading positions of the cooperative platoon.

2. The method according to claim 1, wherein
   the first mode is a fresh air mode in which the HVAC system receives external ambient air from external the host vehicle and passes the external ambient air into a passenger compartment of the host vehicle; and
   the second mode is a recirculation mode in which the HVAC system receives internal air from within the passenger compartment of the host vehicle and returns the internal air back to the passenger compartment.

3. The method according to claim 1, wherein
   the first mode is a first fresh air mode which includes automatically operating the HVAC system to open a forward facing inlet and receive a first external ambient air from external the host vehicle via the forward facing inlet and pass the first external ambient air to the passenger compartment; and
   the second mode is a second fresh air mode which includes automatically operating the HVAC system to obstruct the forward facing inlet, open at least one of a side facing inlet and a rear facing inlet, and receive a second external ambient air from external the host vehicle via the at least one of the side facing inlet and the rear facing inlet and pass the second external ambient air to the passenger compartment.

4. The method according to claim 1, wherein
   the first mode is a fresh air mode in which the HVAC system receives external ambient air from external the host vehicle and passes the external ambient air into a passenger compartment of the host vehicle; and
   the operating of the on-board control device to control the HVAC system to operate in the second mode includes operating a purifying device of the HVAC system to clean the external ambient air before passing the external ambient air to the passenger compartment of the host vehicle.

5. The method according to claim 1, wherein
   the operating of the on-board control device to control the HVAC system to operate in the first mode includes operating the on-board control device to automatically control the HVAC system to operate according to a user input.

6. The method according to claim 1, further comprising
   sensing a temperature of an engine of the host vehicle; and
   while the following distance is less than or equal to the threshold distance and the temperature of the engine is detected as being greater than a temperature threshold, performing an engine cooling countermeasure.

7. The method according to claim 1, further comprising
   presenting a suggested order of the host vehicle and the preceding vehicle based on the low-emission indicator.

8. A method for operating a heating, ventilation, and air conditioning (HVAC) system in a host vehicle based on a following distance between the host vehicle and a preceding vehicle, the method comprising:
   operating a cooperative adaptive cruise control system to form a cooperative platoon of at least the host vehicle and the preceding vehicle and set a desired following distance between the host vehicle and the preceding vehicle;
   detecting the following distance between the host vehicle and the preceding vehicle;
   operating an on-board control device to control the HVAC system in the host vehicle to operate in a first mode while the following distance is detected as being greater than a threshold distance, and to automatically operate in a second mode while the following distance is detected as being less than or equal to the threshold distance;
   determining whether any vehicles of the cooperative platoon are low-emission vehicles; and
   automatically operating the cooperative adaptive cruise control system of the host vehicle to present a suggested order, the suggested order including the low-emission vehicles of the cooperative platoon in leading positions of the cooperative platoon.

9. The system according to claim 8, wherein
the controller is further configured receive a preceding vehicle communication, the communication including a low-emission indication, and determine whether the preceding vehicle is a low-emission vehicle based on the low-emission indication of the preceding vehicle communication.

10. The system according to claim 8, wherein
the first mode is a fresh air mode in which the HVAC system receives external ambient air from external the host vehicle and passes the external ambient air into a passenger compartment of the host vehicle; and
the second mode is a recirculation mode in which the HVAC system receives internal air from within the passenger compartment of the host vehicle and returns the internal air back to the passenger compartment.

11. The system according to claim 8, wherein
the first mode is a fresh air mode in which the HVAC system receives external ambient air from external the host vehicle and passes the external ambient air into a passenger compartment of the host vehicle; and
the operating of the on-board control device to control the HVAC system to operate in the second mode includes operating a purifying device of the HVAC system to clean the external ambient air before passing the external ambient air to the passenger compartment of the host vehicle.

12. The system according to claim 8, wherein
the first mode is a first fresh air mode which includes automatically operating the HVAC system to open a forward facing inlet and receive a first external ambient air from external the host vehicle via the forward facing inlet and pass the first external ambient air to the passenger compartment; and
the second mode is a second fresh air mode which includes automatically operating the HVAC system to obstruct the forward facing inlet, open at least one of a side facing inlet and a rear facing inlet, and receive a second external ambient air from external the host vehicle via the at least one of the side facing inlet and the rear facing inlet and pass the second external ambient air to the passenger compartment.

13. The system according to claim 8, wherein
the first mode includes operating the on-board control device to automatically control the HVAC system to operate according to a user input.

14. The system according to claim 8, wherein
an engine temperature sensor to detect a temperature of an engine of the host vehicle, wherein when the following distance is less than or equal to the threshold distance and the temperature is greater than or equal to a threshold temperature the controller performs an engine cooling countermeasure.

15. A system for operating a heating, ventilation, and air conditioning (HVAC) system in a host vehicle, the system comprising:
a detector configured to detect a following distance between the host vehicle and a preceding vehicle;
a first fresh-air inlet having a first opening facing in a forward direction of the host vehicle;
a second fresh-air inlet having a second opening facing in at least one of a sideward direction and a rearward direction of the host vehicle;
a controller configured to control the HVAC system in the host vehicle to operate in a first fresh-air mode in which the first opening is open and the second opening is closed to receive a forward external ambient air while the following distance is greater than a threshold distance and to automatically operate in a second fresh-air mode in which the second opening is open and the first opening is closed to receive at least one of a sideward external ambient air and a rearward external ambient air while the following distance is less than or equal to the threshold distance; and
a cooperative adaptive cruise control system that is configured to form a cooperative platoon of at least the host vehicle and the preceding vehicle, set a desired following distance between the host vehicle and the preceding vehicle, determine whether any of the vehicles in the cooperative platoon are low-emission vehicles, and present a suggested order including the low-emission vehicles in leading positions of the cooperative platoon.

16. The system according to claim 15, further comprising a purifier, wherein the second mode includes automatically operating the purifier to at least one of clean, purify, filter and ionize the external ambient air from external the host vehicle before supplying the external ambient air to a passenger compartment of the host vehicle.

17. The system according to claim 15, wherein
the second fresh-air mode includes automatically operating the HVAC system to control an engine cooling fan to run while the following distance is less than or equal to the threshold distance.

18. The system according to claim 15, further comprising an engine temperature sensor to detect a temperature of an engine of the host vehicle, wherein when the following distance is less than or equal to the threshold distance and the temperature is greater than or equal to a threshold temperature the controller performs an engine cooling countermeasure.

19. The system according to claim 15, wherein
the first mode includes operating the on-board control device to automatically control the HVAC system to operate according to a user input.

20. The system according to claim 15, wherein
the controller is further configured receive a preceding vehicle communication, the communication including a low-emission indication, and determine whether the preceding vehicle is a low-emission vehicle based on the low-emission indication of the preceding vehicle communication, wherein the controller is further configured to control the HVAC system in the host vehicle to automatically operate in the first mode while the following distance is detected as being greater than the threshold distance regardless of the low-emission indication; automatically operate in the first mode while the preceding vehicle is determined to be a low-emission vehicle regardless of the following distance, and automatically operate in the second mode while the following distance is detected as being less than or equal to the threshold distance and the preceding vehicle is not detected to be a low-emission vehicle.

21. The system according to claim 20, wherein
the controller is further configured to present a suggested order of the host vehicle and the preceding vehicle based on the low-emission indicator.

* * * * *